Patented Oct. 30, 1951

2,573,525

UNITED STATES PATENT OFFICE 2,573,525

THERMOSETTING COMPOSITIONS COMPRISING AMINOPLAST AND CHLOROTRIAZINES

Herbert J. West, Pittsburgh, Pa., assignor to American Cyanamid Company, New York, N. Y., a corporation of Maine No Drawing. Application June 11, 1947, Serial No. 754,066

21 Claims. (Cl. 260—45.3)

This invention relates to rapid-curing aminoplastic resin compositions. More specifically, the invention relates to rapid-curing compositions comprising a thermosetting aminoplastic resin and a chlorotriazine.

Normally, aminoplastic resins require temperatures of at least 200° F., for reasonably fast cure. It has now been found, according to the teachings of this invention, that substantially accelerated cure rates are obtained by incorporating a chlorotriazine with the aminoplastic resin. Through the use of a suitable mono-, di-, or trichlorotriazine, practical curing rates can be obtained over a temperature range of 80°–200° F. The rate of cure may be controlled by varying the degree substitution of chlorine atoms in the triazine range. The greater the chlorine content, the faster will be the curing speed.

Cyanuric chloride is a trichlorotriazine of the formula:

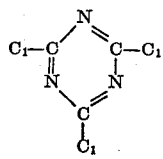

The chlorine radicals are easily replaced stepwise by amino groups so that the monoaminodichlorotriazines or diaminomonochlorotriazines are readily obtained. The chlorine radicals can also be replaced by alcohols at moderate temperature with the liberation of hydrochloric acid. Accordingly, in practicing this invention where the fastest curing speed is desired, cyanuric chloride itself is used as the catalyst in concentrations of 1% or less, based on the weight of resins. A less drastic or slower curing effect can be obtained through the use of an aminodichlorotriazine, and a still slower cure rate is obtained by the diaminomonochloro derivative. The use of a dialkyl aminochlorotriazine is of additional utility since the alkyl groups improve solubility in organic solvents, particularly where the alkyl group is a long chain.

The substituted triazines are readily prepared by reacting the proper molar ratio of an alcohol, ammonia, or an alkyl amine with cyanuric chloride at temperatures ranging from 0° to 100° C.

The invention is particularly useful in controlling the curing speed of urea-formaldehyde and melamine-formaldehyde adhesive compositions and aminoplastic molding compositions, and accelerating the cure of aminoplastic coating compositions so that they may be hardened at temperatures substantially below 200° F., whereby these compositions are useful for the formulations of finishes of wood and other heat-sensitive materials.

In order to more fully describe the invention, the following examples are given by way of illustration:

Example 1

To a solution of an oil-modified alkyd resin and urea-formaldehyde resin present in quantities of approximately 2 parts urea-formaldehyde resin to 1 part of alkyd resin, there was added 0.5% of cyanuric chloride based on the weight of resin solids. Samples of this composition were applied to wood and steel panels, and cured for 72 hours at 78° F., 5 minutes at 250° F., 10 minutes at 200° F., 60 minutes at 150° F., and 2 hours at 125° F. Excellent surfaces were obtained in all cases.

The above composition was further modified with titanium dioxide in an amount equivalent to 1 part per part of resin solids. This composition was applied to wood and steel panels and cured, according to the procedure outlined in the above example, to produce white baked enamel finishes.

Example 2

To a solution in xylol and butanol containing 3 parts of melamine-formaldehyde resin and 1 part oil-modified alkyd resin, there was added 1% cyanuric chloride in dioxane based on the weight of resin solids. This composition was applied to wood and steel panels and cured at 150° F. for one hour. Excellent hard finishes were obtained in this manner.

To the resin solutions described in Example 1 and Example 2, cyanuric chloride in dioxane was added in varying proportions from 0.5% to 1% based on the weight of resin solids. These compositions were applied to steel panels and cured at 150° F. for 50 minutes, 250° F. for 10 minutes, and 200° F. for 5 minutes. The compositions having 1% cyanuric chloride gave slightly more rapid curing and slightly harder finishes than those having 0.5% cyanuric chloride. However, the difference in effectiveness of the 1% compositions over the 0.5% compositions does not warrant the use of an amount above 0.5%, except wherein the application requires a greater hardness and faster cure rate to such an extent that greater quantities of cyanuric chloride are justified.

The above two examples were repeated by substituting dichlorotetradecylaminotriazine, chloroaminotetradecylaminotriazine, and chlorodi-tetradecylaminotriazine, in lieu of the cyanuric chloride. It was noted that the curing time at any temperature increased as the chloro content of the compound decreased, and it was further noted that the dialkyl compounds were more easily dissolved than were the amino alkyl compounds.

As examples of resins employed in this invention, the following illustrations are given:

Urea-formaldehyde resin 3370 parts of 37% formaldehyde solution were charged to a suitable reaction vessel and neutralized to pH 8.6 with 20% sodium hydroxide, and there were then added 6 parts of 85% phosphoric acid. The mixture was heated to 70° C. and 1200 parts of urea were added over a period of an hour. The mixture was then heated to 85° C. and held at that temperature for one hour. 1340 parts of butanol were added and the mixture heated to reflux and held for one hour at reflux. 1550 more parts of butanol were added and the mixture distilled with replacing feed of dry butanol until a batch temperature of 112° C. was reached. The batch was then vacuum concentrated at 90° C. to approximately 65% resin solids. This solution was diluted with xylene and butanol to give a final composition of 20% xylene, 30% butanol and 50% resin solids.

Alkyd resin

One mol of phthalic acid, 0.56 mol of soya fatty acids, and 1 mol of 100% glycerine were heated to 220° C. and held at that temperature for 4 hours. The reaction mixture was then diluted with xylene to form a solution containing 70% resin solids.

The coating composition, obtained by mixing equal portions of these resin dispersions, was blended with accelerators of the type described above in varying portions to obtain rapidly cured surfaces according to the following examples.

Melamine-formaldehyde resin

Two hundred seventy-seven (277) parts of a 37% aqueous formaldehyde solution, 880 parts of melamine and 5540 parts of butanol were charged to a suitable reaction vessel equipped with a stirrer, thermometer, and condenser, and heated to reflux. Dry butanol was added at a rate commensurate with the rate of distillation of butanol. When the temperature of the reaction mixture had reached 115° C., the butanol feed was stopped, and the reaction mixture concentrated to approximately 67% solids. This solution was then diluted with sufficient xylene to give a solution having 50% resin solids.

The chlorotriazines suitable for employment in this invention may be prepared in any suitable manner. However, a most convenient manner for their preparation is illustrated in the following examples:

Chlorodiaminotriazine

Into 800 ml. of acetone, there were dissolved 2 mols of cyanuric chloride. The hot solution was added to water while the temperature was kept to below 5° C. Two mols of ammonia in the form of a concentrated aqueous solution was added while the temperature was maintained below 5° C. The temperature was then raised to 30° C., and 2 mols of ammonia in the form of concentrated aqueous solution thereof was added while maintaining temperature below 30° C. The reaction mixture was then filtered by suction, and the solid obtained was washed, and dried at 68° C.

Dichloroaminotriazine

Into 100 ml. of hot acetone there was dissolved ¼ mol of cyanuric chloride and the resultant solution filtered into a mixture of ice and water. Three hundred seventy (370) ml. of a concentrated ammonium hydroxide solution (having ½ mol ammonia) was added while keeping the temperature below 5° C. The mixture was stirred for 45 minutes, filtered, and the solid obtained was washed with ice cold water, and dried in a vacuum dust cleaner.

Dichlorotetradecylaminotriazine

Into 600 ml. of hot acetone there was dissolved ½ mol of cyanuric chloride. The resultant solution was filtered and cooled to 0° C. One-half (½) mol tetradecyl amine was dissolved in 400 ml. of acetone. This solution was added to the cyanuric chloride solution, while maintaining at a temperature below 5° C. Then approximately 900 ml. of ice cold water was added, the mixture stirred and filtered, and the solid obtained was dried in a vacuum desiccator.

Chloroaminotetradecylaminotriazine

Into 600 ml. of acetone there was dissolved ½ mol of cyanuric chloride and the resultant mixture filtered and cooled to 0° C. One-half mol of tetradecylamine dissolved in 400 ml. of acetone was added to the cyanuric chloride solution in a manner such that the temperature was maintained below 5° C. One-half mol sodium hydroxide dissolved in 100 parts of water was added to the reaction mixture while keeping the temperature below 5° C. One mol of ammonia in the form of a concentrated aqueous solution was added and the temperature of the mixture rapidly raised to 20° C., and held at that temperature while stirring for ½ hour. The mixture was then heated to reflux and maintained at that temperature for approximately ½ hour. Upon setting two layers formed. A colorless solution on the bottom, and an orange solution on top containing a small amount of solid. The layers were separated and the upper layer was cooled to 0° C., and filtered. The solid obtained was washed with water until free from chlorine and then dried in the vacuum desiccator.

Ditetradecylaminochlorotriazine

Into 300 ml. of acetone there was dissolved ¼ mol of cyanuric chloride. The resultant solution was filtered and cooled to 0° C. Into the solution there was then added ¼ mol of tetradecylamine dissolved in 200 ml. of acetone, care being taken to maintain a temperature below 5° C. Ten gms. of sodium hydroxide dissolved in 100 ml. of water was added to the solution while maintaining the temperature below 5° C. One-quarter mol of tetradecylamine was then raised in temperature to 20° C. and mixed with one hundred four gms. of sodium hydroxide dissolved in 100 ml. of water. This mixture was then added to the original solution and heated for one hour. Upon setting overnight, a yellow solid separated which was washed until free from chlorine, and dried in a vacuum desiccator.

Any of the thermosetting aminoplastic resins may be employed in practicing this invention. The proportions of reactants and physical form of the resins will depend somewhat, if not entirely, upon the particular application or utility to which they are to be placed. The resins described hereinabove and illustrated in the examples are indicative of the types which may be suitably employed in surface finishings, adhesives and laminating applications. It is unnecessary to use the alkyd modified resins; however, when applied in the art of surface finishings, it is advisable to modify the resin with an alkyd to produce enhanced toughness to the otherwise brittle finishes. The thermosetting aminoplastic resins in solid form, such as in the dry powder form employed in the molding art, may be suitably blended with the dry chlorotriazines to provide accelerated curing molding compounds, and also molding compounds which may be molded at lowered temperatures.

The specific examples of chlorotriazines and the modifications thereof, are merely illustrative of the general classes and types which may be satisfactorily employed in practicing this invention. Other modifications may be made to obtain other derivatives of trichlorotriazine having the desired catalytic properties, and particularly applicable to specific utilizations in the compositions of this invention, as applied to specific arts. Accordingly, the invention is not to be construed as limited to the specific catalysts or the specific resins described herein above, but is to be construed as encompassing the class of compounds and the class of resins as described in the specification, and defined in the appended claims.

I claim:

1. A composition comprising a thermosetting aminoplastic resin selected from the group consisting of urea-formaldehyde resin and melamine-formaldehyde resin and as a curing accelerator therefor 0.5% to 1.0% of the weight of said resin solids of cyanuric chloride.

2. A composition comprising a urea-formaldehyde resin, an alkyd resin and, as a curing accelerator therefore, 0.5%–1.0% of the weight of said resin solids of trichloro 1,3,5 triazine.

3. A composition comprising a melamine-formaldehyde resin, an alkyd resin and, as a curing accelerator therefor, 0.5%–1.0% of the weight of said resin solids of trichloro 1,3,5 triazine.

4. A composition comprising a thermosetting aminoplastic resin selected from the group consisting of urea-formaldehyde resin and melamine-formaldehyde resin and as the sole curing accelerator therefor 0.5% to 1.0% by weight, based on the weight of said resin solids, of a chloro 1,3,5 triazine selected from the group consisting of trichlorotriazine, dichloroaminotriazine, dichlorotetradecylaminotriazine, chlorodiaminotriazine, chloroditetradecylaminotriazine and chloroaminotetradecylaminotriazine, wherein said chlorotriazine is present in the form of a free base, whenever an amino group is present in said triazine.

5. A composition comprising a thermosetting urea-formaldehyde resin and as the sole curing accelerator therefor 0.5% to 1.0% by weight, based on the weight of said resin solids, of a chloro 1,3,5 triazine selected from the group consisting of trichlorotriazine, dichloroaminotriazine, dichlorotetradecylaminotriazine, chlorodiaminotriazine, chloroditetradecylaminotriazine and chloroaminotetradecylaminotriazine, wherein said chlorotriazine is present in the form of a free base, whenever an amino group is present in said triazine.

6. A composition comprising a thermosetting melamine-formaldehyde resin and as the sole curing accelerator therefor 0.5% to 1.0% by weight, based on the weight of said resin solids, of a chloro 1,3,5 triazine selected from the group consisting of trichlorotriazine, dichloroaminotriazine, dichlorotetradecylaminotriazine, chlorodiaminotriazine, chloroditetradecylaminotriazine and chloroaminotetradecylaminotriazine, wherein said chlorotriazine is present in the form of a free base, whenever an amino group is present in said triazine.

7. A composition comprising a thermosetting aminoplastic resin selected from the group consisting of urea-formaldehyde resin and melamine-formaldehyde resin and as the sole curing accelerator therefor 0.5% to 1.0% by weight, based on the weight of said resin solids, of monochlorodiamino 1,3,5 triazine, wherein said chlorotriazine is present in the form of a free base.

8. A composition comprising a thermosetting aminoplastic resin selected from the group consisting of urea-formaldehyde resin and melamine-formaldehyde resin and as the sole curing accelerator therefor 0.5% to 1.0% by weight based on the weight of said resin solids, of dichloroamino 1,3,5 triazine, wherein said chlorotriazine is present in the form of a free base.

9. A composition comprising an urea-formaldehyde resin and as the sole curing accelerator therefor 0.5% to 1.0% by weight, based on the weight of said resin solids, of monochlorodiamino 1,3,5 triazine, wherein said chlorotriazine is present in the form of a free base.

10. A composition comprising an urea-formaldehyde resin and as the sole curing accelerator therefor 0.5% to 1.0% by weight, based on the weight of said resin solids, of dichloroamino 1,3,5 triazine, wherein said chlorotriazine is present in the form of a free base.

11. A composition comprising an urea-formaldehyde resin and as the sole curing accelerator therefor 0.5% to 1.0% by weight, based on the weight of said resin solids, of dichlorotetradecylamino 1,3,5 triazine, wherein said chlorotriazine is present in the form of a free base.

12. A composition comprising an urea-formaldehyde resin and as the sole curing accelerator therefor 0.5% to 1.0% by weight, based on the weight of said resin solids, of chloroaminotetradecylamino 1,3,5 triazine, wherein said chlorotriazine is present in the form of a free base.

13. A composition comprising an urea-formaldehyde resin and as the sole curing accelerator therefor 0.5% to 1.0% by weight, based on the weight of said resin solids, of ditetradecylaminochloro 1,3,5 triazine, wherein said chlorotriazine is present in the form of a free base.

14. A composition comprising a melamine-formaldehyde resin and as the sole curing accelerator therefor 0.5% to 1.0% by weight, based on the weight of said resin solids, of chlorodiamino 1,3,5 triazine, wherein said chlorotriazine is present in the form of a free base 15. A composition comprising a melamine-formaldehyde resin and as the sole curing accelerator therefor 0.5% to 1.0% by weight, based on the weight of said resin solids, of dichloroamino 1,3,5 triazine, wherein said chlorotriazine is present in the form of a free base.

16. A composition comprising a melamine-formaldehyde resin and as the sole curing accelerator therefor 0.5% to 1.0% by weight, based on the weight of said resin solids, of dichlorotetradecylamino 1,3,5 triazine, wherein said chlorotriazine is present in the form of a free base.

17. A composition comprising a melamine-formaldehyde resin and as the sole curing accelerator therefor 0.5% to 1.0% by weight, based on the weight of said resin solids, of chloroaminotetradecylamino 1,3,5 triazine, wherein said chlorotriazine is present in the form of a free base.

18. A composition comprising a melamine-formaldehyde resin and as the sole curing accelerator therefor 0.5% to 1.0% by weight, based on the weight of said resin solids, of ditetradecylaminochloro 1,3,5 triazine, wherein said chlorotriazine is present in the form of a free base.

19. A composition comprising a thermosetting aminoplastic resin selected from the group consisting of urea-formaldehyde resin and melamine-formaldehyde resin, an alkyd resin and, as the sole curing accelerator therefor, 0.5% to 1.0% by weight, based on the weight of said resin solids, of a chloro 1,3,5 triazine selected from the group consisting of trichlorotriazine, dichloroaminotriazine, dichlorotetradecylaminotriazine, chlorodiaminotriazine, chloroditetradecylaminotriazine and chloroaminotetradecylaminotriazine, wherein said chlorotriazine is present in the form of a free base, whenever said chlorotriazine contains an amino group.

20. A composition comprising an urea-formaldehyde resin and as a curing accelerator therefor 0.5% to 1.0% of the weight of said resin solids of cyanuric chloride.

21. A composition comprising a melamine-formaldehyde resin and as a curing accelerator therefor 0.5% to 1.0% of the weight of said resin solids of cyanuric chloride.

HERBERT J. WEST.

REFERENCES CITED

The following references are of record in the file of this patent:

UNITED STATES PATENTS

| Number | Name | Date |
| --- | --- | --- |
| 2,197,357 | Widmer | Apr. 16, 1940 |
| 2,209,292 | Berger | July 23, 1940 |
| 2,328,424 | D'Alelio | Aug. 31, 1943 |
| 2,331,446 | Widmer | Oct. 12, 1943 |
| 2,368,451 | D'Alelio | Jan. 30, 1945 |